July 1, 1969 S. BALDI 3,452,557
COUPLING FOR SHAFTS AND THE LIKE
Filed March 13, 1967

INVENTOR.
SALVATOR BALDI
BY
ATTORNEY

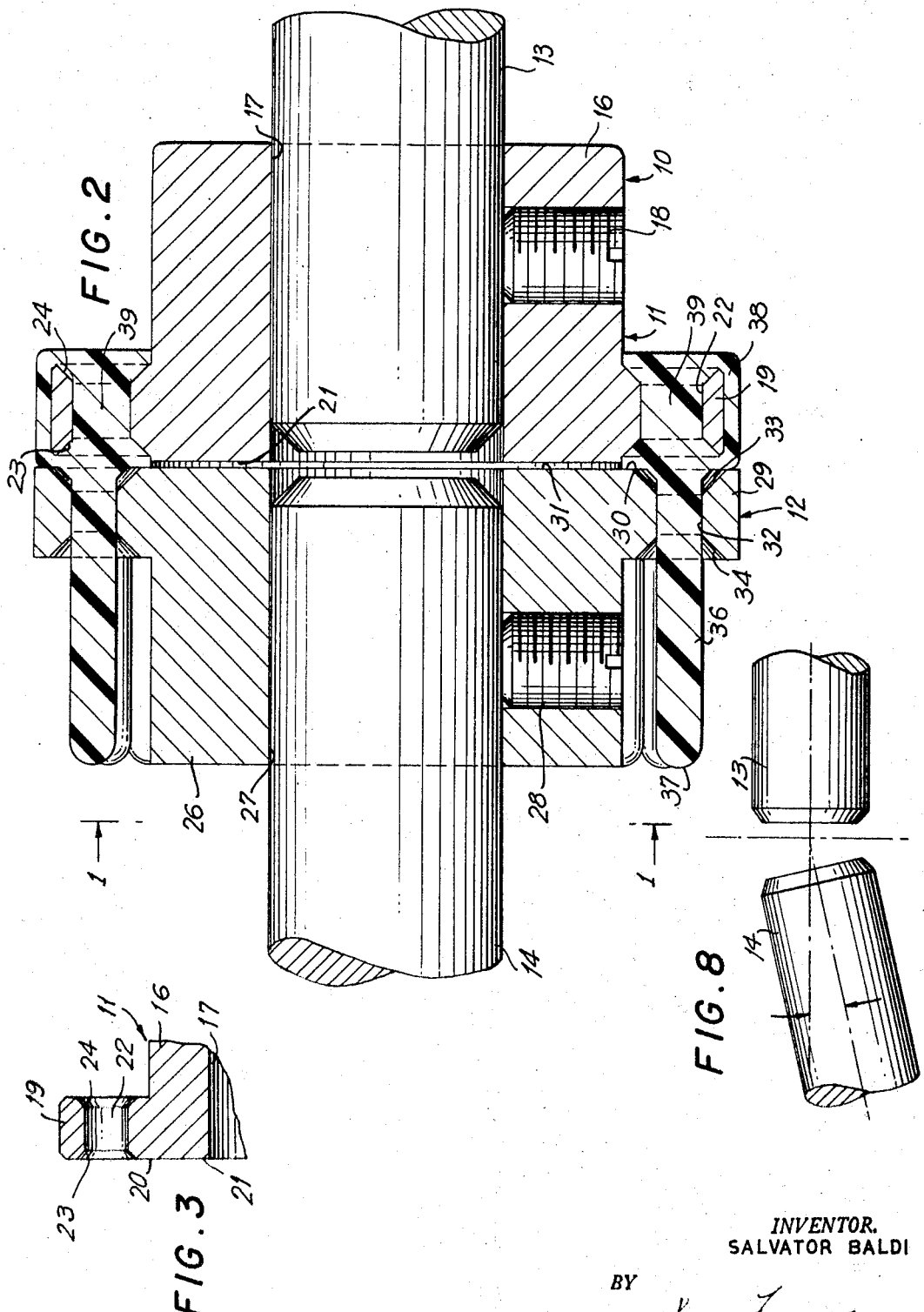

United States Patent Office 3,452,557
Patented July 1, 1969

3,452,557
COUPLING FOR SHAFTS AND THE LIKE
Salvator Baldi, 50 Knolls Drive N.,
Manhasset Hills, N.Y. 11040
Filed Mar. 13, 1967, Ser. No. 622,723
Int. Cl. F16d 3/48, 3/70
U.S. Cl. 64—10     7 Claims

ABSTRACT OF THE DISCLOSURE

In essence this invention includes a pair of rotatable members in facing relation, with one member having a generally annular array of openings extending generally parallel to and concentric with its axis of rotation. A plurality of flexible pins are carried by the other member and extend from the latter through the openings to couple the members together for rotary movement.

*Background of the invention*

As is well known to those versed in the art, a great amount of work has been done in the coupling of rotary members, such as shafts, particularly concerning the problems of misalignment, vibration, impact stresses, and the like. While a great number of couplings have been proposed and used, these prior-art couplings have not been completely satisfactory. Certain of such structures, such as universal joints, are relatively large and expensive, others are incapable of transmission through substantial angles of misalignment, and all are limited in application for one or more reasons.

*Summary of the invention*

Acordingly, it is an important object of the present invention to provide a new and highly improved coupling for rotary shafts, and the like, which overcomes or eliminates many of the problems of the prior art, being capable of operation throughout widely varying angular conditions without appreciable wear and having substantially no backlash.

It is a further object of the present invention to provide a coupling of the type described, which is effectively silent in operation, adapted to carry high-torque loads at high speeds and offers exacting, precise movement or response.

Still another object of the present invention resides in the provision of a coupling having the advantageous characteristics mentioned in the preceding paragraphs which effectively eliminates or reduces vibration, takes impact loads and load changes in size and direction with minimum cycle error and without lost motion.

More particular objects of the present invention reside in the provisions of a coupling of the type described which is capable of operation throughout a wide range of temperature variations, affords insulation between the coupled elements, and permits of longitudinal or end float as well as axial misalignment and/or lateral eccentricity.

Other objects of the present invention will become apparent upon reading the following specification and referring to the acompanying drawings, which form a material part of this disclosure.

The invention accordingly consists in the features of construction, combinations of elements, and arrangements of parts, which will be exemplified in the construction hereinafter described, and of which the scope will be indicated by the appended claims.

*Brief description of the drawing*

FIGURE 2 is a longitudinal sectional view taken generally along the line 2—2 of FIGURE 1.

FIGURE 3 is an enlarged fragmentary sectional view showing an element of the construction of FIGURE 2.

FIGURES 4, 5, 6, 7, and 8 illustrate a variety of adjacent-shaft-end conditions adapted to be coupled employing the coupling of the instant invention.

*Description of the preferred embodiment*

Figure 1:
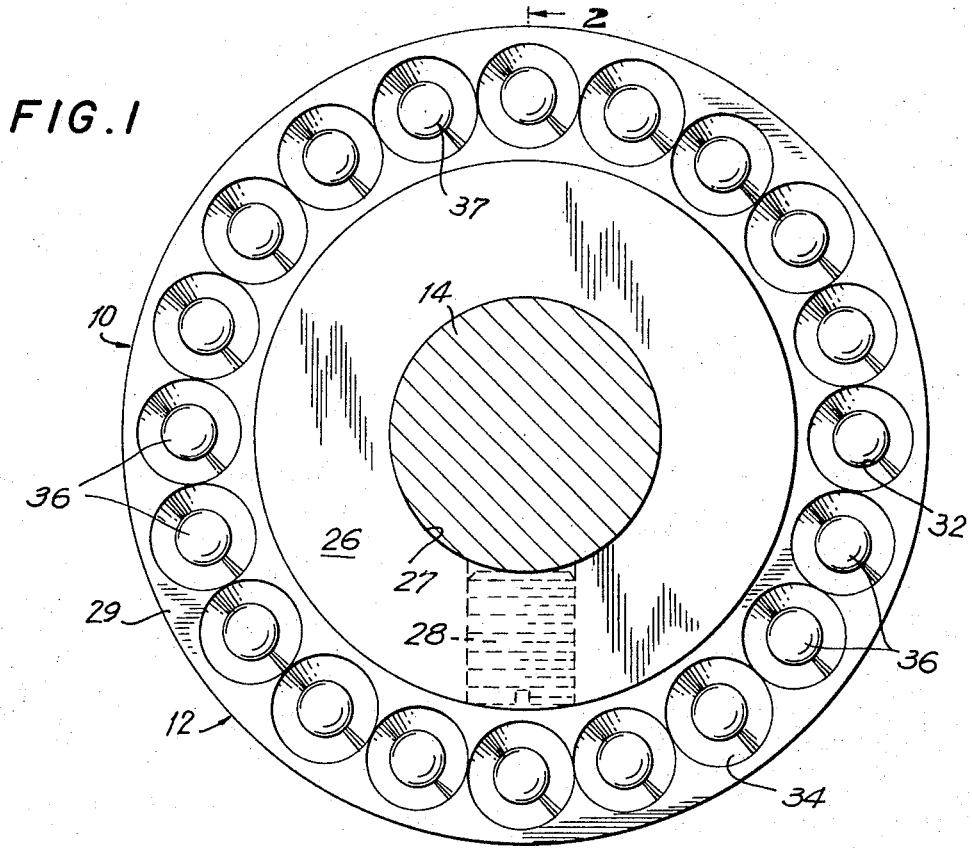
FIGURE 1 is an end view showing a coupling of the present invention, as through a shaft being coupled, taken generally along the line 1—1 of FIGURE 2.

Referring now more particularly to the drawings, and specifically to FIGURES 1-3 thereof, the coupling of the present invention is there generally designated 10, and includes a pair of rotatable coupling members 11 and 12. The coupling 10 of the illustrated embodiment is specifically adapted for coupling a pair of adjacent shaft ends 13 and 14, but it is appreciated that the coupling of the instant invention may be employed for connecting together other rotary elements than shafts, if desired.

More specifically, the coupling member 11 includes a generally cylindrical collar 16 having a coaxial through bore 17 receiving the shaft end 13. Suitable means may be provided for securing the collar or sleeve 16 to the shaft end 13, such as a setscrew 18 threaded radially inwardly through the collar.

The collar 16 is provided, preferably integrally therewith, at one end with a radially outstanding, circumferentially extending flange 14 defining an annular enlargement on the collar 16, if desired. Extending through the flange 19, at circumferentially spaced locations thereabout, are a plurality of through holes or openings 22. More specifically, the through holes or openings 22 are located in an annular array, extending generally parallel to and concentric with the collar 16 and flange 19. Advantageously, the through holes or openings 22 may have their end regions countersunk or flared, as at 23 and 24.

The coupling member 12 is similar in many respects to the coupling member 11, and includes a generally cylindrical collar or sleeve 26 having a through bore 27 receiving the shaft end 14. The collar 26 may carry suitable securing means, such as a setscrew 28 extending radially inward through the collar for securing engagement with the shaft end 14.

At one end of the collar 26, adjacent to the coupling member 11, the collar 26 is provided with a radially outstanding, circumferential flange 29, which may have one side 30 substantially flush with the adjacent end surface 31 of the collar.

A plurality of through holes or openings 32 are formed in the flange 29, assuming an annular array generally concentric with the axis of the collar 26 and flange 29, and each extending generally parallel thereto. The through holes 32 are preferably relatively great in number, limited only by the desired hole diameter and space, and are advantageously formed with their ends countersunk or flared, as at 33 and 34. In practice, the number and location of holes 32 may advantageously be selected to correspond to the pitch distance of a particular gear, for purposes appearing more fully hereinafter.

It will be observed that an elongate flexible member or generally cylindrical pin 36 extends from the coupling member 11 through each hole 32 and terminates at a free end 37 spaced from the flange 29. The plurality of pins 36 are fixedly carried by the coupling member 11, being secured to the flange 19 by a casing or rim 38 extending circumferentially about the flange 19 and having a channel-like cross section conformably engaging transversely about the latter flange. It has been found uniquely advantageous to fabricate the casing or rim 38 integrally with the several pins 36, as by molding the rim and pins in situ on the flange 19. Unique and unexpected advantages have been found by employing plastic material for molding the rim 38 and pins 36, particularly plastic material having the characteristics of polyurethane.

It will thus be appreciated that the channel-like rim 38 defines means mounting the pins 36 on the flange 19. Further, advantageously molded integrally with the rim 38 may be a plurality of tie members 39 extending between opposite sides or walls of the rim 38 and through the respective openings 22. The tie members 39 thus serve to positively anchor the integrally molded rim 38 and pins 36 against movement relative to the flange 19 and collar 16.

In practice, the pins 36 may be a slip fit into the respective holes 32, to facilitate engagement and disengagement of the coupling members 11 and 12. Further, the flared ends 33 and 34 of the openings 32 enable the pins 36 to more freely flex and maintain accurate coupling despite misalignment between shafts 13 and 14. Also, it will be appreciated that a spur gear may be substituted for the coupling member 12, or employed in conjunction therewith, with the pins 36 engaging between each adjacent pair of gear teeth, if desired.

Figure 4:
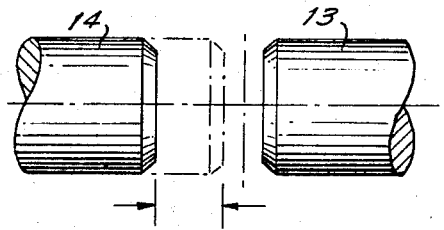

In practice it has been found that the coupling described hereinbefore is highly effective in properly coupling shafts as illustrated in FIGURES 4-8. That is, in FIGURE 4, is shown a pair of shaft ends wherein at least one shaft end is subject to longitudinal movement or endwise floating. The instant coupling 10, may of course, maintain effective coupling between the shafts of FIGURE 4 by sliding engagement of the pins 36 in the openings 32.

Figure 6:
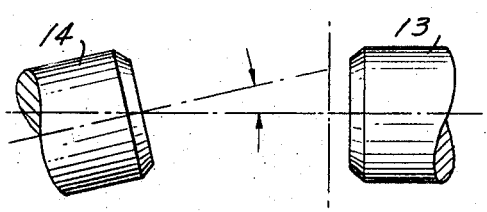
Figure 5:
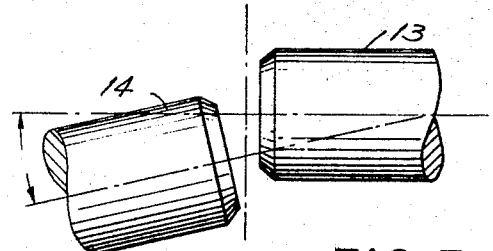

The angular misalignment of shafts shown in FIGURES 5 and 6 is also capable of being coupled by the instant invention, by flexure of the pins 36.

Figure 7:
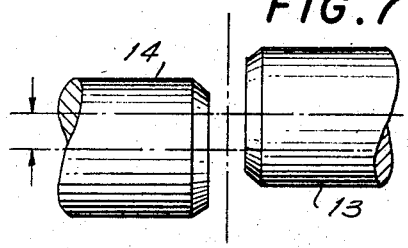

Also, in offset shafts, such as the parallel misalignment of FIGURE 7, pin flexure permits of accurate coupling.

The instant coupling device 10 is also capable of serving as a universal joint, say to connect the angularly misaligned shafts of FIGURE 8.

While the relatively great number of flexible pins 36, each pin being of relatively small diameter and highly flexible, has been found extremely satisfactory under a wide variety of actual operating conditions, it is appreciated that the pins may be reinforced, if desired, say by the molding therein of steel wire, or other reinforcement.

From the foregoing, it is seen that the present invention provides a coupling device which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A coupling comprising a pair of rotatable members arranged in generally facing relation with their facing sides generally perpendicular to their respective axes of rotation, one of said members being formed with an annular array of openings extending generally parallel to and concentric with its axis of rotation, and a plurality of flexible pins carried by the other member extending from the facing side thereof generally parallel to and concentric with the rotary axis of said other member, said pins extending through corresponding openings of said one member terminating at a free end spaced therefrom to rotatably couple said members, and a unitary mounting means fixedly securing said pins to said other member.

2. A coupling according to claim 1, said openings flaring in the direction toward said other member for relatively free flexure of said pins.

3. A coupling according to claim 1, said pins being fabricated of polyurethane.

4. A coupling comprising a pair of rotatable members arranged in generally facing relation with their facing sides generally perpendicular to their respective axes of rotation, one of said members being formed with an annular array of openings extending generally parallel to and concentric with its axis of rotation, and a plurality of flexible pins carried by the other member extending from the facing side thereof generally parallel to and concentric with the rotary axis of said other member, said pins extending through respective openings to rotatably couple said members, in combination with mounting means fixedly securing said pins to said other member, said mounting means comprising a rim encircling said other member, said pins each being integral at one end with said rim.

5. A coupling according to claim 4, in combination with a plurality of tie portions each extending through said other member and integral at its opposite ends with said rim, to anchor the latter to said other member.

6. A coupling comprising a pair of rotatable members arranged in generally facing relation with their facing sides generally perpendicular to their respective axes of rotation, one of said members being formed with an annular array of openings extending generally parallel to and concentric with its axis of rotation, and a plurality of flexible pins carried by the other member extending from the facing side thereof generally parallel to and concentric with the rotary axis of said other member, said pins extending through respective openings to rotatably couple said members, said other member being formed with an annular array of additional openings extending generally parallel to and concentric with its axis of rotation, and pin-mounting means including tie members extending through and anchored in said additional openings, said pins being integral with said pin-mounting means.

7. A coupling according to claim 6, said pin-mounting means including a rim extending about said other member, said tie members each extending through one of said additional openings and connected at its opposite ends to said rim, said pin being integral with and extending from said rim.

References Cited

UNITED STATES PATENTS

| 2,439,479 | 4/1948 | Mackmann | 64—10 |
| 2,619,211 | 11/1952 | Belden | 64—10 X |
| 2,696,719 | 12/1954 | Sklar | 64—10 X |
| 2,775,879 | 1/1957 | Doak | 64—11 |
| 2,948,128 | 8/1960 | Smith | 64—10 |

FOREIGN PATENTS 137,290 3/1930 Switzerland.

HALL C. COE, Primary Examiner.

U.S. Cl. X.R.

64—11